(12) United States Patent
Groskreutz et al.

(10) Patent No.: US 7,835,691 B2
(45) Date of Patent: Nov. 16, 2010

(54) REMOTE VEHICLE-RELATED NOTIFICATION

(75) Inventors: Bruce A. Groskreutz, Grand Blanc, MI (US); Thomas Gault, Clawson, MI (US); Matt C. Videtich, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 1121 days.

(21) Appl. No.: 11/047,540

(22) Filed: Jan. 31, 2005

(65) Prior Publication Data

US 2006/0047415 A1 Mar. 2, 2006

Related U.S. Application Data

(63) Continuation-in-part of application No. 10/930,023, filed on Aug. 30, 2004, now Pat. No. 7,532,859.

(51) Int. Cl.
H04B 7/185 (2006.01)

(52) U.S. Cl. .............. 455/12.1; 455/404.2; 701/29; 701/30; 701/31; 701/32; 370/316

(58) Field of Classification Search .............. 701/1, 701/2, 29, 30, 31, 32, 36, 201; 342/357.1; 455/12.1, 13.1; 370/316
See application file for complete search history.

(56) References Cited

U.S. PATENT DOCUMENTS

| | | | |
|---|---|---|---|
| 6,339,736 B1 | 1/2002 | Moskowitz et al. | 701/29 |
| 6,370,454 B1 | 4/2002 | Moore | 701/29 |
| 6,677,854 B2 * | 1/2004 | Dix | 340/438 |
| 6,687,587 B2 | 2/2004 | Kacel | 701/33 |
| 2003/0102966 A1 * | 6/2003 | Konchin et al. | 340/445 |
| 2004/0193420 A1 * | 9/2004 | Kennewick et al. | 704/257 |
| 2005/0060070 A1 * | 3/2005 | Kapolka et al. | 701/29 |
| 2005/0203673 A1 * | 9/2005 | El-Hajj et al. | 701/1 |
| 2005/0256615 A1 * | 11/2005 | Wang et al. | 701/1 |
| 2005/0267647 A1 * | 12/2005 | Kamdar et al. | 701/1 |
| 2006/0025907 A9 * | 2/2006 | Kapolka et al. | 701/29 |

OTHER PUBLICATIONS

U.S. Appl. No. 10/867,401, filed Jun. 14, 2004, "Automobile Recall Notification System and Method for Using the Same," assigned to General Motors Corporation.

* cited by examiner

*Primary Examiner*—Nick Corsaro
*Assistant Examiner*—Amanuel Lebassi

(57) ABSTRACT

A vehicle notification method comprising: receiving a remotely transmitted message at a mobile vehicle; after receiving the transmitted message and in response thereto, setting, within a module in the mobile vehicle, a code retrievable by a vehicle diagnostic check, and alerting a user of the vehicle.

10 Claims, 4 Drawing Sheets

REMOTE VEHICLE-RELATED NOTIFICATION

This application is a continuation-in-part of application, U.S. Ser. No. 10/930,023, entitled "Targeted Messaging for Mobile Vehicles Using Satellite Radio Broadcasts," filed Aug. 30, 2004, now U.S. Pat. No. 7,532,859 the disclosure of which is incorporated herein by reference.

BACKGROUND OF THE INVENTION

A satellite radio service provider uses one or more satellites to broadcast content for each of its channels, and often has terrestrial repeaters to improve broadcast coverage in areas of satellite signal blockage. A satellite signal can contain over one hundred channels, the number depending on bandwidth and channel compression, and encoding parameters. Many of these broadcasts may be delivered with additional data such as station identification, song titles, and program schedules.

Other channels for wireless communication with vehicles include analog cellular, digital transceivers, PCS, GSM, 3G, 4G, and may include packet data capabilities as well as mobile IP.

It is known in the mobile phone industry to use over the air parameter administration (OTAPA) to push mobile transceiver related messages to mobile transceivers such as cell phones. For example, preferred roaming lists (PRLs) may be updated over certain networks by sending a message to the network identifying one or more phones for update of the PRL. When the transceiver is detected or registered on the network, the updated PRL is downloaded to the transceiver and thereafter used by the transceiver for phone-related functions. It has also been suggested to download other transceiver-related information such as pre-paid calling minutes through this method.

SUMMARY OF THE INVENTION

Advantageously, according to a preferred example, a vehicle notification method is provided comprising the steps of: receiving a transmitted message at a mobile vehicle; after receiving the transmitted message and in response thereto, (a) setting, within a module in the mobile vehicle, a code retrievable by a vehicle diagnostic tool, and (b) alerting a user of the vehicle.

Advantageously, according to another example, the code is retrieved from the module during servicing by the vehicle diagnostic tool and is utilized to inform a service technician of a service notice for the mobile vehicle.

Advantageously, according to another example, a vehicle notification system is provided comprising a node on a vehicle for receiving a remotely transmitted message; a control unit coupled to the node receiving the transmitted message, a memory accessible by the control unit, wherein, in response to the transmitted message, the control unit sets a code retrievable by a vehicle diagnostic check; and an alert device for alerting a user of the vehicle responsive to the transmitted message.

Advantageously, according to another example, a method utilizes a mobile communication network that detects a presence of a wireless transceiver on the network, receives a message targeted to the wireless transceiver, and transmits the message to the wireless transceiver responsive to the detection of the presence of the wireless transceiver on the network, the improvement comprising: attaching a non-transceiver-specific vehicle-related notification to the message; transmitting the notification with the message to the network; transmitting the notification with the message to the wireless transceiver responsive to the detection of the presence of the wireless transceiver on the network, wherein the wireless transceiver is coupled to a vehicle; and communicating with an in-vehicle module responsive to the received notification.

DETAILED DESCRIPTION OF THE PRESENTLY PREFERRED EMBODIMENTS

Figure 1:
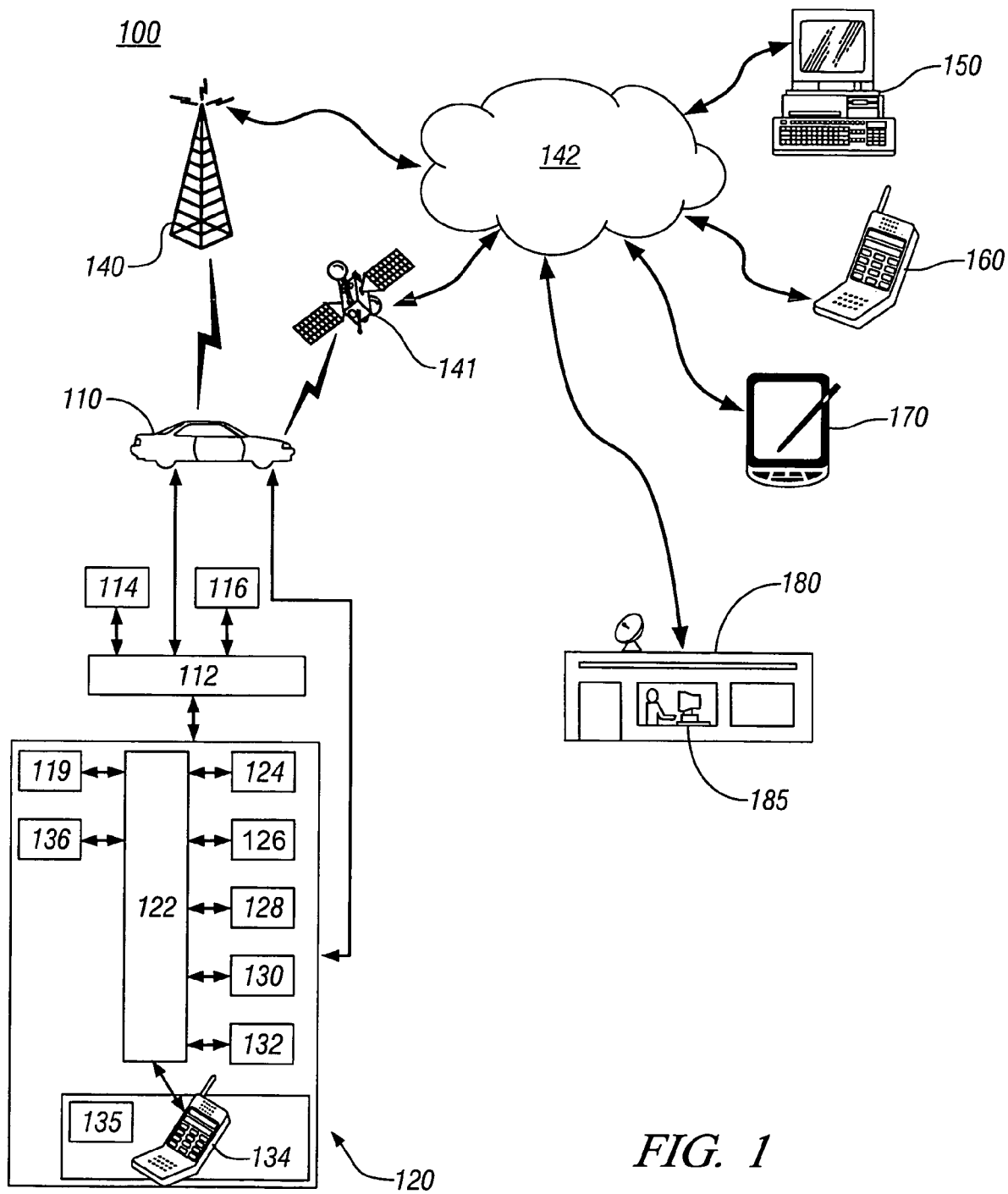
FIG. 1 illustrates an example system in which this invention may be implemented.

FIG. 1 is a schematic diagram in which the system 100 includes a mobile vehicle 110, a telematics unit 120, one or more wireless carrier systems 140 or satellite carrier systems 141, one or more communication networks 142, and one or more call centers 180. In one embodiment, mobile vehicle 110 is a vehicle such as a car or truck equipped with suitable hardware and software for transmitting and receiving voice and data communications.

An example telematics unit 120 includes, either internally or accessible through an in-vehicle network or other connections, a digital signal processor (DSP) 122 connected to a wireless modem 124, a global positioning system (GPS) receiver or GPS unit 126 (or other location detection unit), an in-vehicle memory 128, a microphone 130, one or more speakers 132, an embedded or in-vehicle transceiver 134 and internet access appliance 135. Each of the transceiver 134, Internet appliance 135 and satellite radio receiver 136 may be referred to as a node capable of receiving a remotely transmitted message. DSP 122 is also referred to as a microcontroller, controller, host processor, or vehicle communications processor. In one embodiment, GPS unit 126 provides longitude and latitude coordinates of the vehicle. In-vehicle transceiver 134 may be any suitable wireless transceiver, such as cellular, PCS, GSM, 3G, 4G, combinations of the above or other suitable device for wireless communications with the call center 180.

Telematics unit 120 performs known functions in the telematics services industry including communicating voice and/or data over network 142 to call center 180. Telematics unit 120 may also directly or indirectly communicate with other systems such as to user computer 150 (for example, through a web portal), cellular phone 160, and a handheld device, such as personal digital assistant 165. Call center 180 can receive calls from the telematics unit 120 or place calls thereto according to known methods. Calls can connect a vehicle user to a person 185 or an automated response system. Additionally, calls or other communications can connect the vehicle telematics unit 120 to call center systems for the purpose of data transfer and other known telematics services functions. Secure methods for call center and vehicle connections are known in the industry and specific examples need not be set forth herein because they are not central to the invention. The call center 180 may be a distributed system with one or more geographic locations with distributed data and command facilities.

The telematics unit 120 includes voice recognition software referred to as voice recognition engine 119. For example, pressing a button in vehicle 110 activates voice recognition engine 119 to accept commands that are executed by the telematics unit for in-vehicle functions or for connecting to call center 180 or another service center, or for making wireless phone calls. Multiple buttons may be implemented to correspond to multiple functions as is known in the telematics services art.

In a preferred example, a vehicle user presses a button and the voice recognition is activated to accept voice commands. The user interacts with a voice prompt menu that includes choices allowing the user to control vehicle components, functions and systems. Some of the functions and systems can be within the telematics unit 120, while others, for example units 114 and 116, are not part of the telematics unit 120, but are connected thereto through an in-vehicle data bus represented by reference 112. In a preferred example, unit 116 is a control module utilized by the in-vehicle power train system, and preferably is a powertrain control module and unit 114 is a body control module.

Satellite carrier system 141 transmits radio signals to a satellite radio receiver 136 within the vehicle 110. The satellite radio receiver may be integral with the telematics unit 120 (as shown) or a separate unit in communication with the telematics unit 120 through the vehicle data bus 112 or other connection. In general, satellite radio system 141 may comprise a known satellite digital audio radio service (SDARS) that transmits digital information over a satellite and ground repeater communication network to receivers capable of receiving the SDARS signals. The service typically comprises digitally encoded music but may also include data either relating to the music or relating to a service accessible though the satellite radio receiver.

Data is transmitted into the satellite radio system 141 from an uplink facility that may be part of the call center 180 or may be a separate facility. If the uplink facility is a separate facility, there is preferably a data connection between the call center 180 and the uplink facility to facilitate the flow of data from the call center into the satellite radio system.

In a preferred example, a desired vehicle notification is provided from an automotive manufacturer to the call center 180. The call center 180 receives the notification and prepares a data message for the one or more vehicles 110. The data message can be transmitted a variety of ways depending upon the type of notification, the number of desired recipients, and the communication equipment on the vehicles.

In a first example, the notification is a vehicle service bulletin for a plurality of vehicles 110, many or all of which contain satellite radio receivers. The data message is sent to an uplink facility (either integral with or separate from call center 180) for the satellite radio service and the notification is broadcast over the satellite radio system.

Vehicles 110 receive the notification and as part of the digital data received with the SDARS and each vehicle 110 processes the notification to determine whether it is targeted at that specific vehicle. For example, the notification may be provided to the telematics unit 120 either from an internal SDARS receiver or through the vehicle data bus 112 from an SDARS receiver external to the telematics unit 120.

The targeting can be designated a number of ways. In one example, the notification includes a vehicle identification number (VIN) range for affected vehicles (which may be designated by a partial VIN representing model and year, etc.). The telematics unit compares the VIN of the vehicle 110 to the range in the notification and rejects the message if the VIN is not within the range, or otherwise accepts the message.

If the message is accepted, the telematics unit 120 sends a command message over the data bus 112 to either power train control unit 116, body control unit 114, or other unit if specified by the message data or stored control commands in the telematics unit 120. The command message achieves the setting of a code in the desired unit indicating receipt of a vehicle service notification. For example, the code may be a diagnostic trouble code (DTC) that can be retrieved during vehicle servicing. The setting of a DTC may also trigger a telltale or other indicator within the vehicle indicating that the vehicle should be serviced. Alternatively, the telematics unit 120 may directly trigger the telltale or other indicator within the vehicle. In this manner, a notification required for a large set of vehicles is transmitted to the vehicles, providing an indicator to the vehicle operators that the vehicles should be serviced and setting DTCs. The DTCs can be used by vehicle service providers to indicate that the vehicle received a notification and to help identify the particular service or services specified by the notification.

In the above example, the message was accepted based upon the VIN range indicated. In an alternative, another identification may be used. For example the notification may identify the vehicles by specifically addressing the satellite radio receiver by unit identification number. The satellite radio receiver may accept or reject the message before passing it on to the telematics unit (if not integral therewith) or further process the message similar to the processing described above.

The above example illustrates use of the satellite radio service to distribute a vehicle notification. It may be desirable to utilize another service. For example, the vehicle or vehicles subject the notification may not contain SDARS receivers or there may be a small number of affected vehicles and it is not necessary to broadcast the notification to a broad number of vehicles.

In this example, the notification is transmitted using any of the data communication capabilities of the wireless transceiver 134 (or internet appliance 135). The message may be targeted based upon any identifier associated with the transceiver or vehicle 110 and may be a specific communication, such as dial-up call to the vehicle transceiver 134 from the call center 180, or a mobile IP, packet data or other communication to the vehicle 110. The message may also be a broadcast communication if the network 142 supports that capability for communication to wireless transceiver 134. Once received by the telematics unit, the notification is processed as described above to store a code accessible during vehicle servicing and to alert the vehicle operator of the received notification.

Figure 2:
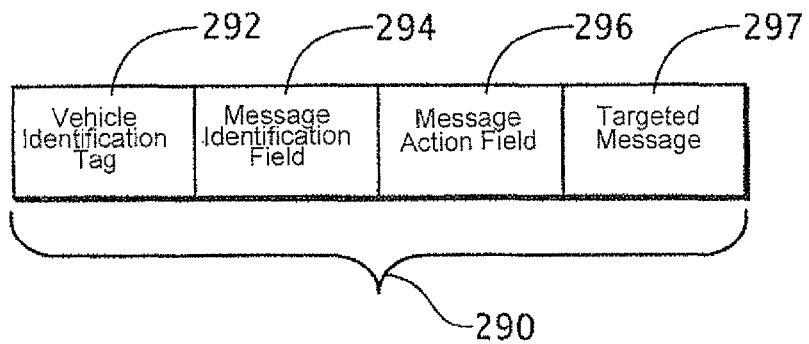
FIG. 2 illustrates an example message structure suitable for use with the example in FIG. 1.

Referring to FIG. 2, an example broadcast message 290 may include one or more information fields such as vehicle identification tag 292, a message identifier field 294, a message action field 296, and targeted message 297. Vehicle identification tag 292 includes one or more identification numbers associated with one or more mobile vehicles in a target group of mobile vehicles. In one example, vehicle identification tag 292 includes an alphanumeric code of the vehicle identification number (VIN). In another example, vehicle identification tag 292 includes one or more characters associated with the VIN that indicate a particular manufacturer, model, make, or country of manufacture. In another example, vehicle identification tag 292 includes a vehicle identifier of the mobile vehicle such as the VIN, an electronic serial number of a telematics unit within the mobile vehicle, a cell phone number of a telematics unit within the mobile vehicle, a satellite radio receiver identification number associated with the satellite radio receiver in the mobile vehicle, or a pre-assigned vehicle reference number stored within the mobile vehicle. Frequent messages sent to a specific vehicle or group of vehicles may be received and processed, for example, by first sending and storing the pre-assigned vehicle reference number within the mobile vehicle so that targeted message 297 is processed whenever satellite broadcast message 290 with the pre-assigned vehicle reference number is received.

Message identifier field 294 includes, for example, a message identification number associated with targeted message 297. The message identification number may be correlated, for example, to the time sequence in which targeted message 297 is first sent and may indicate other functions or message information.

Message action field 296 includes, for example, how the targeted message is to be processed and presented to the user or occupant of the mobile vehicle, such as on a display, over a speaker, or through an in-vehicle audio or visual output device. For example, field 296 might designate whether the notification should set a particular code in the power train control unit 116, the body control module 114, the telematics unit 120, or some other unit not shown, such as a brake control unit. For example, the particular code is a DTC indicating a notification has been received.

Message action field 296 may contain a message response command that allows telematics unit 120 of FIG. 1 to dial a predetermined number from in-vehicle telematics unit 120 to call center 180 in response to a user input. Message action field 296 may also include a play-delay indicator directing telematics unit 120 to store targeted message 297 until prompted or otherwise directed to play targeted message 297. An indicator light, predetermined tone or tone sequence, or short message may be displayed or played within the vehicle to indicate that a message is stored and waiting to be delivered. For example, a radio head is able to display blinking or scanned characters to indicate that a targeted message is available for playing.

Targeted message 297 preferably includes data to be stored in a specific location in the telematics unit 120 or another unit that can be retrieved along with the DTC. In one example, the targeted message includes a value that, when retrieved along with the DTC during vehicle servicing, designates the service bulletin or other notification received by the vehicle. The targeted message may also include, for example, service information, an advertisement, a recall notification, or a vehicle alert message for output through an output device.

In example operation, targeted message 297 may be played either automatically after vehicle start-up or in response to a user input, such as with a depression of a button on a radio or telematics unit, or an appropriate voice command. A phone number may be included within targeted message 297 to allow manual or automatic connection to an operator or recorded message options in response to targeted message 297.

The method allows for the introduction of satellite radio offers, automobile service announcements, and other types of marketing that are targeted to a specific owner or a group of owners of vehicles equipped with appropriate equipment, based on parameters such as vehicle type, vehicle model, geographic region, point-of-sale dealership, garage location, or additional factory-installed equipment on the vehicle. This type of personalization allows specific call-in numbers and messages to be sent to targeted vehicles.

Figure 3:
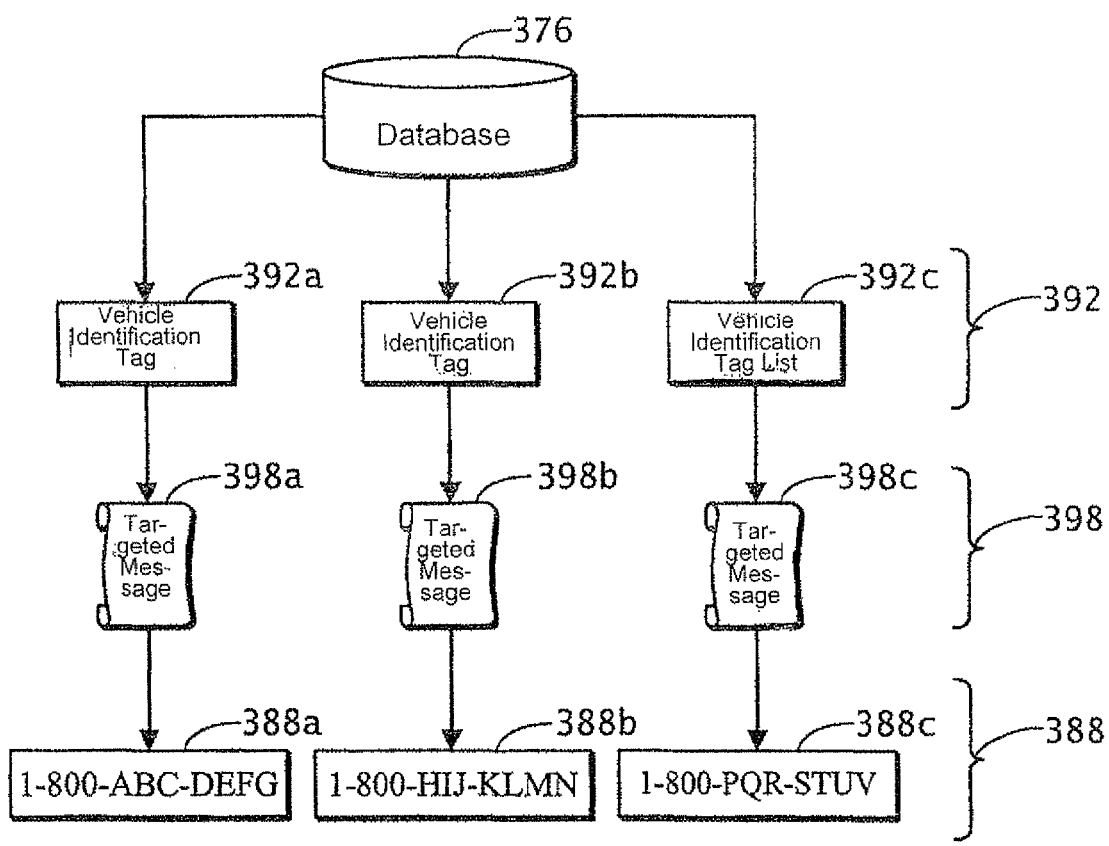
FIG. 3 illustrates example message construction suitable for use with the example of FIG. 1.

Referring now also to FIG. 3, one or more customer data records in a database 376, which are located, for example, at call center 180 of FIG. 1, are filtered to create lists of targeted groups of mobile vehicles that are intended to receive a targeted message 398. Targeted message 398 can be designated for a specific group of mobile vehicles by using a vehicle identification tag 392. Vehicle identification tags 392 and targeted messages 398 are sent via a suitable wireless communication to the mobile vehicles.

In another example, customer data records in database 376 are searched to determine a desired set of vehicles. A vehicle identification tag list 392*c* is generated based on the customer data records and combined with a targeted message 398*c* to alert owners of a service bulletin or recall notification regarding their particular vehicle. A toll-free number 388*c* may be displayed that can be called to receive more details regarding the recall notification or other vehicle alert. Other services and messages may be delivered in a similar manner.

Figure 4:
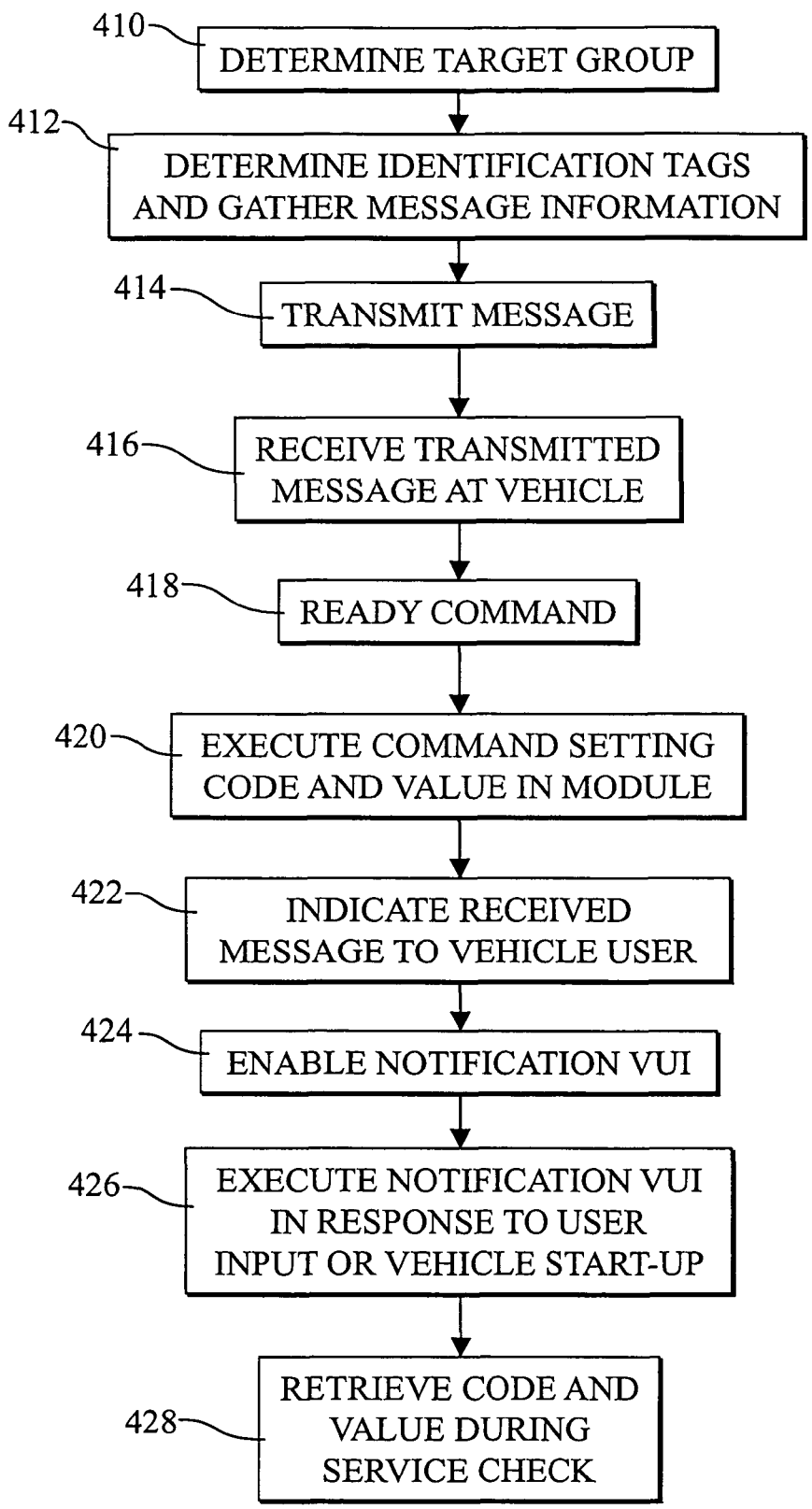
FIG. 4 illustrates example method steps suitable for use with the system of FIG. 1.

Referring now also to FIG. 4, a target group of mobile vehicles is determined, as seen at block 410, for example, by a vehicle manufacturer that desires to send a notification to one or more vehicles. Alternatively, the target group of mobile vehicles may be determined at a call center where customer data records are retained and where calls can be sent to or received from one or more mobile vehicles. One or more customer data records may be filtered to determine the target group of mobile vehicles based on, for example, vehicle model, vehicle manufacturer, location of manufacture, year of manufacture, vehicle options, a subscription status, or one or more subscriber preferences. In another example, an algorithm selects only a portion of a target group of mobile vehicles for delivery of a targeted message so that the call center can control the rate and volume of returned calls. Appropriate information for setting DTCs, data fields, providing call-in numbers and targeted messages or other applicable messages may be attached to each group.

At block 412, vehicle identification tags are determined for the target group of mobile vehicles by database lookup that cross references the target vehicles with their identification tags. The vehicle identification tags may include, for example, a list of vehicle identification numbers or other identification numbers associated with one or more mobile vehicles in the target group. Also at step 412, the remaining information for the message to be transmitted is gathered Once all the information is gathered, the vehicle identification tag and the targeted message, including the information for setting the proper DTC code, the value to be stored indicating the notification being sent, an optional call-in number, and any other user information necessary for sending and receiving the targeted message, are readied for transmission. The information may be transmitted to an uplink facility of a satellite radio service provider, or queued for transmission from the call center to the wireless transceivers of the targeted vehicles. Alternatively, the message may be posted to a website (preferably a secure site) that the Internet appliance 135 (FIG. 1) regularly addresses to retrieve information.

The vehicle tag and the targeted message are sent, as represented by block 414. If the satellite radio service provider is used to transmit the information, then the satellite radio identification may be appended to the messages at the satellite radio service provider facility (if not already provided) to ensure acceptance of the message by the satellite radio receiver within vehicle 110. The steps for uplink and transmission to the satellites and terrestrial repeaters are known to those skilled in the satellite radio art and need not be set forth herein. If the message is transmitted by dialup connection to the vehicle, then the call center 180 establishes this connection and transmits the data in a manner known in the telematics arts. Additionally, packet data messaging service or mobile IP connection may be used in a known manner for these services.

Block 416 represents receipt of the transmitted message in the mobile vehicle 110. The message is received either by the satellite radio receiver 136, the transceiver 134 or Internet appliance 135. If the satellite radio receiver is not part of the telematics unit 120, then the message content is preferably transmitted over the vehicle data bus or other connection to the telematics unit 120 for processing.

Block 418 represents example action taken in response to the received message. The control unit processing the received message identifies the message as a service bulletin or recall and confirms that the vehicle is the targeted vehicle by confirming that the VIN or other identification tag in the message matches that of the vehicle. Upon confirmation, the control unit creates a command to set the appropriate code (e.g., DTC) in one of the control units. The vehicle can be configured so that one DTC is utilized for all bulletins received through remotely transmitted messages. Alternatively, the notification can be coded to identify the particular system or subsystem to which the notification relates. In the latter example, the control unit processes the command set to specify the particular vehicle control module (e.g., 114 or 116) in which the DTC will be set and that will receive the value identifying the notification. The designation of the appropriate command set may be accomplished by simple look-up based upon the coded notification, or alternatively the command set may be include in the notification.

At block 420, the telematics unit then sends the command set to the appropriate control unit. For example, if an engine related notification is received, the telematics unit sends a command to the power train control unit 116 setting a DTC in the control unit and, if desired for the particular bulletin, resulting in the illumination of an indicator on the vehicle instrument panel alerting the vehicle operator of the received notification (block 422). Additionally, the telematics unit sends a command loading a value in the power train control unit 116 identifying the notification, for example, by storing an encoded number that a service person can cross-reference when servicing the vehicle.

In an alternative to sending the DTC to the engine control unit or other control unit, the DTC may be set in the telematics unit where the value identifying the notification may also be stored.

Additionally, also at block 422, the notification may contain information to be played for the vehicle operator. For example, specific messages and telephone numbers are extracted from the delivered message and stored in memory for action at a predetermined time, such as the next ignition cycle, immediately, once every twenty ignition cycles, or upon an input from a vehicle occupant. A portion of the message or an indicator may be displayed or otherwise conveyed to occupants within the mobile vehicle to indicate that a message is waiting or to indicate message content.

The targeted message is played using an audio output device, a visual output device, or other message delivery system in the mobile vehicle. The activating user input may be a verbal command or an activated by depressing a button on an in-vehicle radio, entertainment console, in-vehicle communications device, or in-vehicle telematics unit.

In one example, the transmitted message includes a message response command to dial a predetermined number from the in-vehicle telematics unit to the call center in response to a user input. The transceiver in the vehicle places a wireless call with the help of the telematics unit to a wireless service provider or a call center in response to the targeted message. For example, when the user responds to a prompt, a predetermined phone number associated with the targeted number is dialed and connected accordingly so the user can hear vehicle-related information, or to allow the system to perform a desired function.

In one example, the transmitted message includes a trigger activating a portion of a pre-established voice user interface (VUI) in the telematics unit 120 (block 424). For example, when a notification is received by the telematics unit, a voice menu is enabled so that when the vehicle operator presses the telematics button (block 426) or otherwise activates the unit, the VUI informs the vehicle operator that the notification has been received, provides pre-set instructions, such as offering commands that will connect the telematics unit to a service center or perform another standard service, and responds to the commands spoken-by the user.

Step 428 represents servicing of the vehicle where a service technician performs a routine vehicle check, for example, using an automotive service scan tool. The tool retrieves the DTC set in response to the notification, and the stored value, if utilized, and can then perform the necessary system service or maintenance as required by the bulletin or recall. Upon completion of the service, the service technician resets the DTC so that the user no longer receives visual or audible notifications of the service bulletin for which the service has been already completed.

In a telematics enabled vehicle, the service check and, in some cases repair, may be done remotely through the telematics system. Thus the diagnostic tool for the vehicle includes remote diagnostic capabilities of the telematics service provider. For example, if the notification prompts a vehicle operator to initiate a telematics connection by depressing the telematics service button, all stored DTCs may be transmitted to the telematics service provider when the connection is established. This may be achieved by the telematics unit controller issuing commands to all of the control modules in the vehicle, receiving the DTC set in response to the issued commands, and sending the set as a data set to the telematics service provider call center 180.

The operator, or an automated system, at the telematics service provider receives the DTC set, identifies the DTC that was set as a result of the notification received by the vehicle, and associates the DTC with a proposed response. For example, the proposed response may be an audible instruction for the operator to take the vehicle for service. Alternatively the proposed response may be that the vehicle needs a software or calibration upgrade to address issues related to the bulletin associated with the notification. The vehicle operator can be prompted to indicate consent to receiving the software or calibration upgrade. If the vehicle operator agrees, then the upgrade is downloaded from the call center 180 to the vehicle telematics unit 120. The telematics unit 120 then issues appropriate commands over the vehicle data bus 112 to program the affected control module with the received calibration or software upgrade.

In this previous example, the telematics unit 120 is programmed with control routines known to those skilled in the vehicle calibration and programming arts to allow the telematics unit 120 to update calibrations or reflash module memory 128. If protocol requires that the vehicle be in a certain state, for example, engine off, but accessory power on, for reprogramming, then the telematics unit 120 will prompt the vehicle operator of the requirement and will delay start of reprogramming or calibration until it confirms that the vehicle 110 is in the required state.

Figure 5:
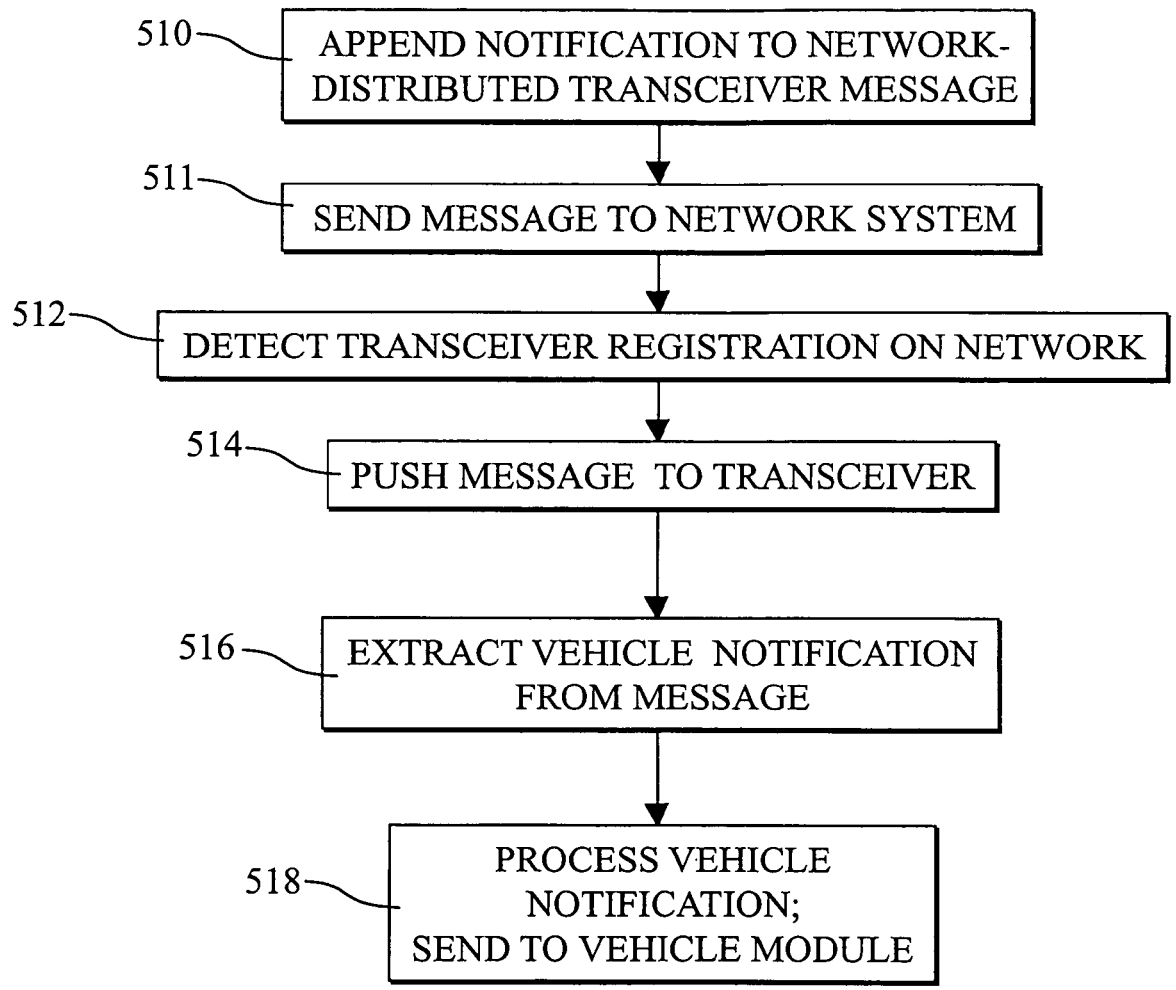
FIG. 5 illustrates additional example method steps suitable for use with the system of FIG. 1.

Referring now also to FIG. 5, example steps for transmitting the targeted message utilizing the mobile communication network are provided. Some communication networks have capability to push messages to mobile transceivers using over the air parameter administration (OTAPA) or equivalent methods. This message path has been used to update transceiver-related information, such as preferred roaming lists (PRLs). In this example, a vehicle related message, e.g., a notification of a service bulletin or recall, that does not relate to transceiver parameter administration, is appended or inserted into a network message such as for OTAPA (block 510).

At block 511, the message is sent to the mobile communication network, where it can be transmitted to the appropriate vehicles 110 through their transceivers 134. In one example, each message includes an electronic serial number (ESN) for the designated transceiver 134. The mobile communication network detects whether each ESN for which there is a message is registered on the network (block 512) and, if so, pushes the message to the transceiver (block 514). If the transceiver is not registered on the network, then the message is held until the transceiver is detected on the network (or until a predetermined time-out period). Upon detection of the transceiver on the network, the message is forwarded to the transceiver.

Upon receipt of the message by the transceiver, the notification for the vehicle is extracted from the message (block 516) and processed by the telematics unit 120 (block 520). During processing, the telematics unit 120 transmits a command to the appropriate vehicle system control module (e.g., 114 or 116) as described above.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A vehicle notification method for automatically providing a self-contained vehicle repair instruction package comprising:
    receiving at a vehicle a remotely transmitted message, the remotely transmitted message including both a VIN range and a set of vehicle service instructions;
    determining at the vehicle whether a VIN of the vehicle falls within the VIN range of the remotely transmitted message;
    discarding the remotely transmitted message if it is determined that the vehicle VIN does not fall within the VIN range of the remotely transmitted message and otherwise providing the set of vehicle service instructions to a vehicle memory for storage;
    alerting a user of the vehicle to render the vehicle for service, at which time the set of vehicle service instructions is retrievable from the vehicle memory; and
    servicing the mobile vehicle.

2. The method of claim 1, wherein the step of providing the set of vehicle service instructions to a vehicle memory for storage includes the substeps of:
    formulating a vehicle network command for the module; and
    transmitting the vehicle network command over an in-vehicle network to the vehicle memory.

3. The method of claim 1, also including the step of:
    setting a value in the vehicle memory identifying the transmitted message.

4. The method of claim 1, wherein the vehicle service instructions are wirelessly retrievable from the vehicle memory during servicing.

5. In a mobile communication network that detects a presence of a wireless transceiver on the network, receives a message targeted to the wireless transceiver, and transmits the message to the wireless transceiver responsive to the detection of the presence of the wireless transceiver on the network, the improvement comprising:
    attaching a non-transceiver-specific vehicle-related notification to the message, the vehicle-related notification comprising vehicle service instructions directed to vehicle service personnel;
    transmitting the notification with the message to the network;
    transmitting the notification with the message over the network to the wireless transceiver responsive to the detection of the presence of the wireless transceiver on the network without separately transmitting the message to the vehicle service personnel, wherein the wireless transceiver is coupled to a vehicle;
    communicating with an in-vehicle module responsive to the received notification; and
    setting, within the module, a code retrievable by a vehicle diagnostic check.

6. The method of claim 5, also comprising the step of alerting a user of the vehicle.

7. The method of claim 5, wherein communicating with the in-vehicle module includes sending at least a part of the notification to the in-vehicle module.

8. A vehicle notification system comprising:
    a node on a vehicle for receiving a remotely transmitted message, the remotely transmitted message including both a VIN range and a set of vehicle service instructions;
    a control unit coupled to the node receiving the transmitted message for determining whether a VIN of the vehicle falls within the VIN range of the remotely transmitted message, and discarding the remotely transmitted message if it is determined that the vehicle VIN does not fall within the VIN range of the remotely transmitted message and otherwise providing the set of vehicle service instructions for storage;
    a vehicle memory accessible by the control unit for storing the set of vehicle service instructions; and
    an alert device for alerting a user of the vehicle responsive to the receiving transmitted message;
    wherein the vehicle also includes a network, wherein the memory is within a system control module coupled to the network, and wherein the control unit transmits commands over the network to the control module.

9. The vehicle notification system of claim 8, also comprising a voice user interface, wherein the voice user interface is responsive to the received message.

10. The vehicle notification system of claim 9, wherein the voice user interface provides information to the user of the vehicle responsive to the message.

* * * * *